United States Patent [19]

Sheldon

[11] Patent Number: 4,458,668

[45] Date of Patent: Jul. 10, 1984

[54] PACKAGE TO FORM PANEL STRUCTURE FOR USE ON WATER BODY

[76] Inventor: Dunstan P. Sheldon, 1752 E. Altadena Dr., Altadena, Calif. 91001

[21] Appl. No.: 399,424

[22] Filed: Jul. 19, 1982

[51] Int. Cl.³ .............................................. F24J 3/02
[52] U.S. Cl. ...................... 126/415; 4/498; 126/450; 403/295; 403/300
[58] Field of Search .............. 126/415, 416, 450; 403/205, 300, 305, 295; 4/488, 489, 493, 494, 498

[56] References Cited

U.S. PATENT DOCUMENTS

| | | | |
|---|---|---|---|
| 2,580,555 | 1/1952 | Kroeger | 126/415 |
| 3,226,118 | 12/1965 | Nehl | 403/300 |
| 3,501,178 | 3/1970 | Watts | 403/305 |
| 3,502,330 | 3/1970 | Cheftel | 403/295 |
| 3,984,881 | 10/1976 | Gerlach | 126/415 |
| 3,984,882 | 10/1976 | Forman et al. | 126/415 |
| 4,022,187 | 5/1977 | Roberts | 126/415 |
| 4,157,801 | 6/1979 | Elmer | 403/295 |
| 4,222,366 | 9/1980 | Acker | 126/415 |
| 4,270,232 | 6/1981 | Ballew | 126/415 |

Primary Examiner—James C. Yeung
Attorney, Agent, or Firm—William W. Haefliger

[57] ABSTRACT

A package is adapted for assembly to form a panel unit to be deployed on a body of water to alter heat transfer to or from the water or to block evaporation. The package includes:
(a) multiple frame sections adapted to be coupled together in end-to-end relation to provide a loop-shaped frame bounding an open zone, and
(b) a flexible sheet sized for connection to the loop-shaped frame so as to extend crosswise of that zone.

9 Claims, 11 Drawing Figures

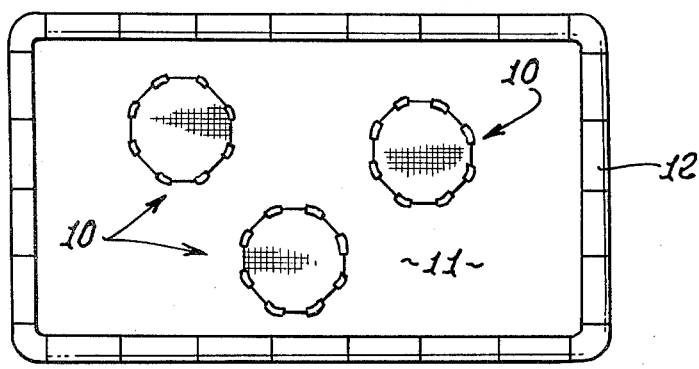
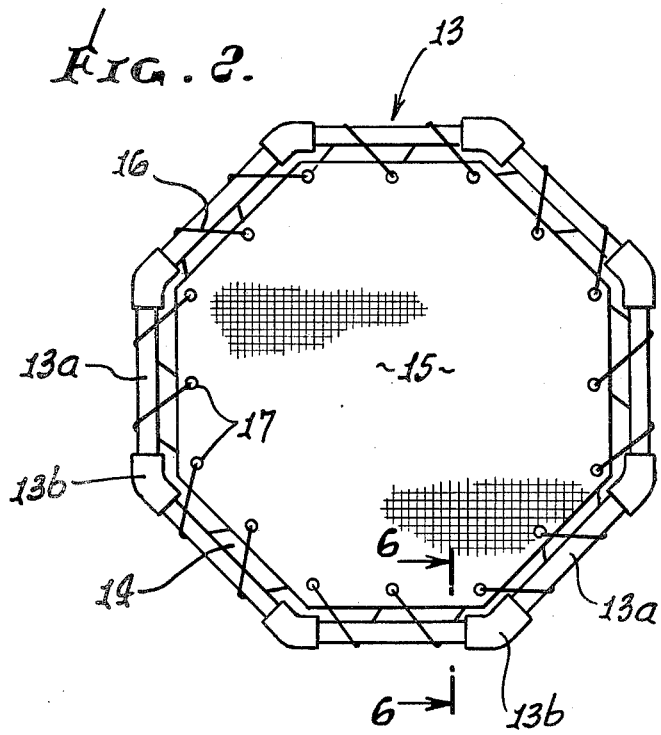
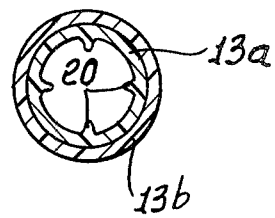
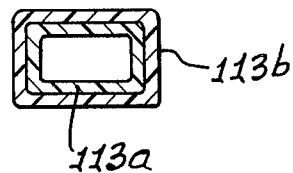
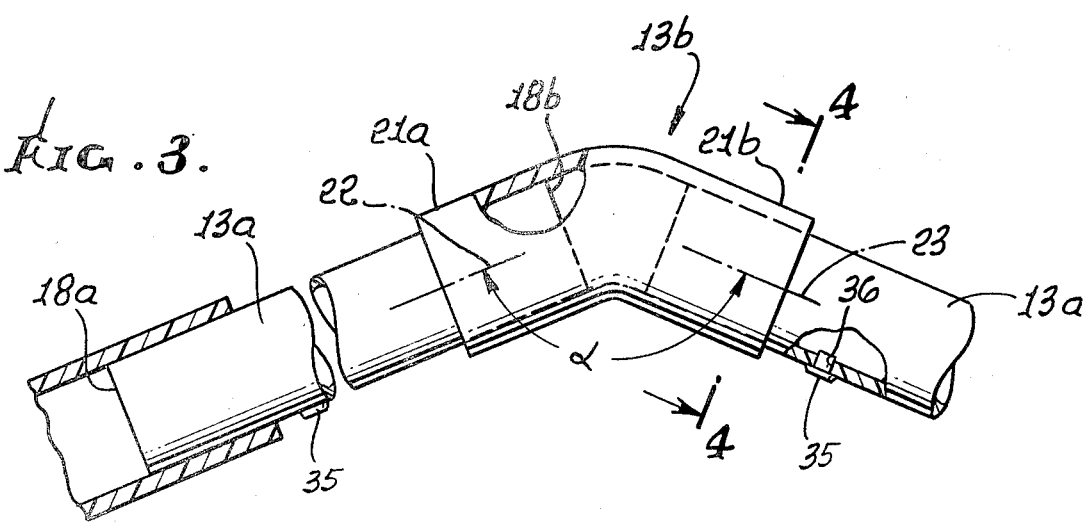

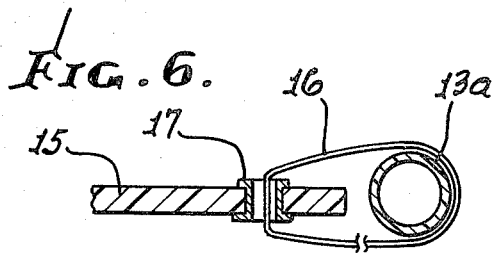
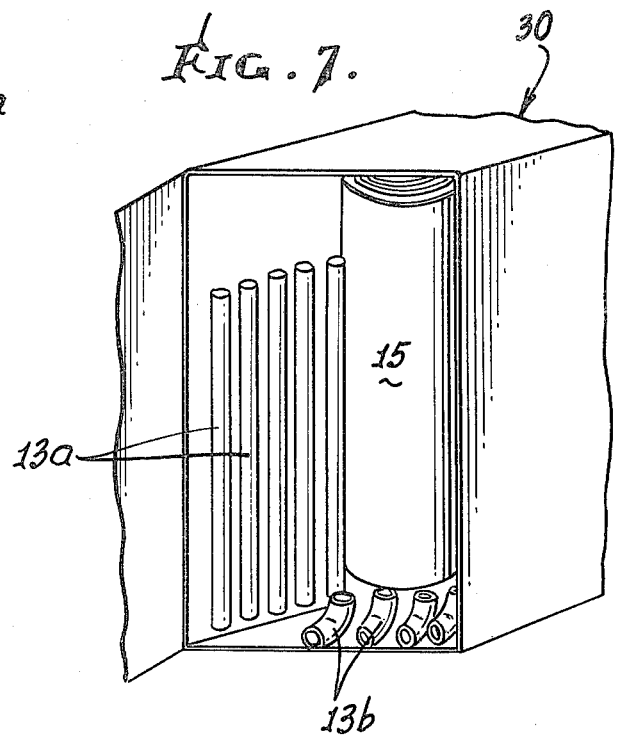
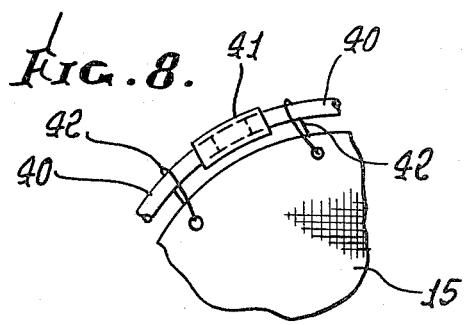
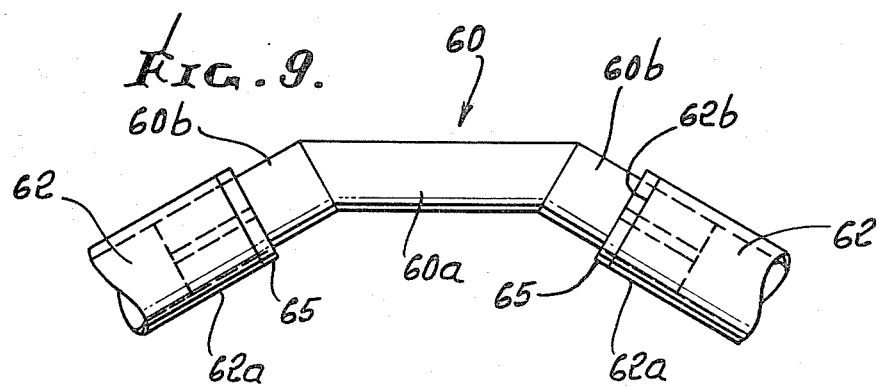
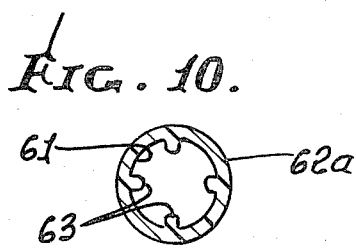
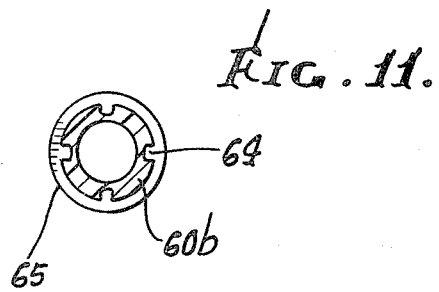

PACKAGE TO FORM PANEL STRUCTURE FOR USE ON WATER BODY

BACKGROUND OF THE INVENTION

This invention relates generally to apparatus for retaining heat in and transferring solar energy to bodies of water, and more particularly concerns solar panel units adapted to float and receive solar radiation for transferring heat to water therebeneath, and also to block evaporation of water which would otherwise carry heat to the atmosphere.

Devices of the general type with which the invention is concerned have been previously disclosed in U.S. Pat. Nos. 3,984,882 and 3,984,881. Such devices are bulky and large in diameter, and consequently difficult to transport or ship.

SUMMARY OF THE INVENTION

It is a major object of the invention to provide a package which may be shipped in pre-assembled form, and assembled into panel unit form at or near a pool site, for deployment. Basically, such a package comprises (a) multiple frame sections adapted to be coupled together in end-to-end relation to provide a loop-shaped frame bounding an open zone, (b) a flexible sheet sized for connection to said loop-shaped frame so as to extend crosswise of said zone.

As will be seen, certain of the frame sections are typically elongated and have hollow interiors, and others of the frame sections may typically comprise short couplers adapted to telescopically interfit ends of the certain frame sections. The short couplers may have shallow elbow shape and receive the ends of the elongated sections which are typically straight.

In addition, means is provided to rapidly interconnect the assembled frame to the flexible plastic sheet, as by winding of a strand about the frame and through retainers on the sheet; and additional means may be provided to controllably admit liquid such as water into hollow interiors of the frame sections, to provide ballast, for purposes as will appear.

The frame sections may have circular or rectangular cross sections, as will be described.

These and other objects and advantages of the invention, as well as the details of an illustrative embodiment, will be more fully understood from the following specification and drawings, in which:

DRAWING DESCRIPTION

FIG. 1 is a plan view of a swimming pool in which solar panels are deployed;

FIG. 2 is an enlarged plan view of a solar panel unit;

FIG. 3 is a further enlarged and fragmentary view of a portion of the frame shown in FIG. 2;

FIG. 4 is a section taken on lines 4—4 of FIG. 3;

FIG. 5 is a view like FIG. 4, but showing a modification;

FIG. 6 is an enlarged section taken on lines 6—6 of FIG. 2;

FIG. 7 is a side view of a shipping carton containing the FIG. 2 panel unit, in pre-assembled condition, FIG. 8 is a fragmentary view showing a modification;

FIG. 9 is a view like FIG. 3 showing a modification; and

FIGS. 10 and 11 are end views of tubular and plug sections.

DETAILED DESCRIPTION

Referring to Fig. 1, panel units 10 are shown deployed on the surface of a body of water 11 such as is contained by swimming pool structure 12. The floating units 10 are polygonal in shape, and function to intercept solar radiation and to transfer solar heat by conduction to the pool water; in addition, they act to prevent heat loss from the pool due to evaporation. Units 10 may have octagonal or other polygonal shapes.

Each unit 10 basically comprises a loop-shaped plastic frame, one example being shown at 13 in FIG. 2 and bounding an open zone 14; a plastic sheet 15 extends across zone 14, and also has polygonal boundary shape to correspond to the frame. Means to retain the sheet to the frame may advantageously take the form of a line 16, such as a strand or rope, wound about the frame and through retainers such as eyelets 17 attached to the flexible pastic sheet. See FIG. 6 in this regard. Sheet 15 extends crosswise of open zone 14, and may consist of polypropylene or polyethylene.

In accordance with the invention, the frame 13 comprises multiple sections adapted to be coupled together in end-to-end relation to provide the loop-shaped frame shape. Referring to FIGS. 3 and 4, certain sections 13a illustrated are linearly elongated and have opposite ends 18a and 18b. Sections 13a are typically hollow or tubular and may consist of extruded and rigid plastic material such as PVC. FIG. 4 shows the section 13a as having strengthening ribbing at 20 which tends to prevent bending of the tubular section which is circular.

As shown, others of the frame sections 13b comprise short couplers adapted to telescopically interfit ends of the frame sections 13a. The couplers as shown have elbow shape, with shallow bends, the bend angle indicated at $\alpha$; i.e. tubular portion 21a has an axis 22 extending at angle $\alpha$ relative to axis 23 of tubular portion 21b. Axis $\alpha$ is less than 180° and typically equal to or greater than 90°.

FIG. 5 shows a modified frame section 113a with rectangular cross section, and received in a coupler 113b also having a rectangular cross section. Such cross sections provide rigidity to resist bending. The sections 13a may be bonded to couplers 13b, and section 113a bonded to coupler 113b, as by a suitable adhesive such as an epoxide.

FIG. 7 shows the frame sections 13a and 13b prior to their end-to-end assembly in a shipping carton 30, along with sheet 15 in folded condition. Accordingly, the carton and the components may be of relatively small and easy-to-ship size, as compared with the final panel unit 10, which typically is between 5 and 8 feet in diameter. The buyer simply assembles the sections 13a and 13b in end-to-end telescopic relation to form the completed loop-shaped frame. He then winds the line or strand 16 about the frame through the eyelets 17 to attach the panel sheet 15 to the frame. The unit is then deployed on the pool water, along with other units, as in FIG. 1. Such units float due to the low density of the plastic frame material.

It is a further feature of the invention to provide means to controllably admit liquid (such as pool water) into the hollows or hollow interiors of multiple frame sections, in order to provide ballast tending to prevent wind induced lifting of the panel unit from the water body. Such means may advantageously take the form of a plug 35 removably and sealingly received in a side opening 36 in one of the sections 13a as shown in FIG.

3. When the plug is removed, and the frame sub-merged in the pool water, the water enters the hollow of the section, and also flows into others of the sections due to their end-to-end hollow intercommunication. FIG. 3 also shows two such plugs 35 on another section, to be removed for admitting water into one side opening and to pass air from the other side opening.

FIG. 8 shows a modification wherein the multiple frame sections 40 are tubular and legnthwise slightly arcuate. They are joined in end to end relation, to form a loop, by short tubular couplers 41. The plastic sheet 15 is connected to the sections 40 as by ties 42, as shown.

FIGS. 9–11 show a further modification, wherein a coupler 60 has elbow configuration, with a central portion 60*a* and two end portions 60*b*, with solid cross sections. The generally circular cross section portions 60*b* define plugs for reception in the circular openings 61 defined by the ends 62*a* of tubular sections 62. The ends 62*a* have ribs 63 thereon which extend axially and project inwardly to fit in corresponding notches 64 in the plug end portion 60*b*, so as to resist relative turning. Also, the end plug end portions 60*b* have abutments thereon, such as flanges 65, to engage terminals 62*b* defined by tubular sections 62. This limits the endwise telescopic interfit of the sections.

I claim:

1. In a panel unit to be deployed on a body of water to alter heat transfer to or from the water or to block evaporation,
    (a) a loop shaped plastic frame that is defined by end-to-end assembled frame sections, the frame bounding an open zone, certain of said frame sections being elongated, and others of the frame sections comprising short couplers telescopically interfitting ends of said certain sections, said certain frame sections being substantially straight, and exceeding four in number, said couplers having shallow angled elbow shape, and
    (b) a flexible sheet extending uninterruptedly crosswise of and substantially completely across said zone and means attaching the sheet to said frame, said means comprising a flexible strand wound about said loop-shaped frame and passing through retainers in the form of eyelets on edge portions of the sheet, said sheet attached to the frame solely by the strand.

2. The panel of claim 1 wherein certain of said frame sections are elongated and have hollow interiors.

3. The panel unit of claim 2 wherein said certain frame sections have circular cross sections.

4. The panel unit of claim 2 wherein said certain frame sections have generally rectangular cross sections.

5. The panel unit of claim 2 wherein said certain frame sections have internal ribbing.

6. The panel unit of any of claims 1–5 wherein the frame sections are hollow, and including means to controllably admit liquid into the hollows of mulitple frame sections, to provide ballast tending to prevent wind induced lifting of the unit from the water body, said means including side openings in said hollow sections and removable plugs in said openings, the panel unit deployed on said body of water.

7. The panel unit of claim 1 wherein said certain frame sections are lengthwise arcuate.

8. The package of claim 1 wherein said couplers define plugs having shoulders thereon adapted for reception in ends of said certain frame sections to block relative rotation therebetween.

9. The package of claim 8 wherein said plugs have abutments thereon adapted to engage terminals defined by said certain frame sections to limit the endwise telescopic interfit of said sections.

* * * * *